United States Patent
Ho et al.

(10) Patent No.: US 8,184,707 B2
(45) Date of Patent: May 22, 2012

(54) METHOD AND APPARATUS FOR ENCODING MULTIVIEW VIDEO USING HIERARCHICAL B FRAMES IN VIEW DIRECTION, AND A STORAGE MEDIUM USING THE SAME

(75) Inventors: Yo Sung Ho, Gwangju (KR); Kwan Jung Oh, Gwangju (KR)

(73) Assignees: Gwangju Institute of Science and Technology, Gwangju (KR); KT Corporation, Seongnam (KR)

( * ) Notice: Subject to any disclaimer, the term of this patent is extended or adjusted under 35 U.S.C. 154(b) by 507 days.

(21) Appl. No.: 12/377,990

(22) PCT Filed: Aug. 17, 2007

(86) PCT No.: PCT/KR2007/003949
§ 371 (c)(1),
(2), (4) Date: Mar. 30, 2009

(87) PCT Pub. No.: WO2008/020733
PCT Pub. Date: Feb. 21, 2008

(65) Prior Publication Data
US 2010/0232510 A1 Sep. 16, 2010

(30) Foreign Application Priority Data

Aug. 18, 2006 (KR) .................. 10-2006-0078149

(51) Int. Cl.
*H04N 7/12* (2006.01)
*G06K 9/36* (2006.01)

(52) U.S. Cl. .............. 375/240.16; 382/232; 382/236

(58) Field of Classification Search ............ 375/240.16, 375/240.12, 240.15; 382/232, 236
See application file for complete search history.

(56) References Cited

U.S. PATENT DOCUMENTS

| 6,804,301 B2 * | 10/2004 | Wu et al. .................. 375/240.12 |
| 6,999,513 B2 * | 2/2006 | Sohn et al. ................ 375/240.16 |
| 2007/0121722 A1 * | 5/2007 | Martinian et al. ....... 375/240.12 |

FOREIGN PATENT DOCUMENTS

| JP | 11-018091 A | 1/1999 |
| JP | 11-161800 A | 6/1999 |
| JP | 2000-132683 A | 5/2000 |

OTHER PUBLICATIONS

International Search Report for application PCT/KR2007/003949 filed Aug. 17, 2007.

* cited by examiner

*Primary Examiner* — Gims Philippe
*Assistant Examiner* — Richard Carter (57) ABSTRACT

The invention provides a method of encoding a multi-view video and an encoder capable of calculating global disparity between pictures at different viewpoints in the multi-view video and forming a hierarchical B picture in both view and time directions on the basis of the calculated global disparity, thereby improving encoding efficiency. According to an embodiment of the invention, there is provided an encoder for encoding data for pictures captured at different viewpoints in a multi-view video. When a picture at one of the first and last viewpoints is encoded into an I picture, the encoder encodes a picture that is captured at the other viewpoint but is disposed in the same time direction into an VP picture.

15 Claims, 9 Drawing Sheets

| region A | region B | region C | region D |

(b)

| region A' | region B' | region C' | region D' |

METHOD AND APPARATUS FOR ENCODING MULTIVIEW VIDEO USING HIERARCHICAL B FRAMES IN VIEW DIRECTION, AND A STORAGE MEDIUM USING THE SAME

TECHNICAL FIELD

The present invention relates to a method and apparatus for encoding a multi-view video, and more particularly, to a method and apparatus for encoding a multi-view video that calculates global disparity between pictures at different viewpoints, forms a hierarchical B picture in both view and time directions in the multi-view video on the basis of the global disparity, and uses a multi-view space-time picture arrangement structure in which the pictures having high priority are arranged in a matrix.

BACKGROUND ART

A multi-view video is a set of view images obtained by taking a picture of the same object using a plurality of synchronized cameras (for example, 8 cameras) that are arranged in a line or an arc shape. The multi-view video can be applied to a stereoscopic display apparatus, and enables a viewer to see a stereophonic broadcast, a 3D broadcast, 3D DMB contents, or an FTV (free-view TV) program at his/her desired viewpoint.

Figure 1:
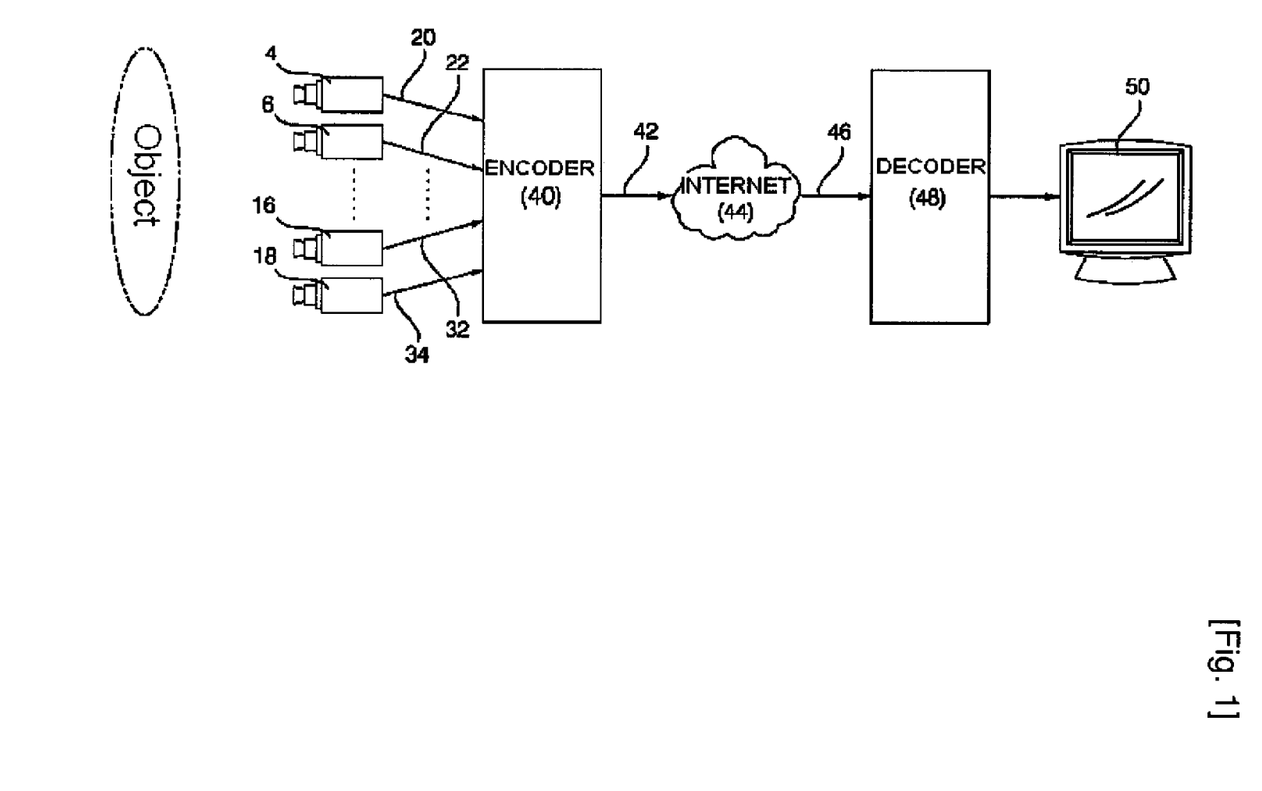
FIG. 1 is a diagram schematically illustrating a multi-view video system including multi-view video encoder and decoder.

FIG. 1 is a diagram schematically illustrating a general multi-view video transmitting system. In the multi-view video transmitting system, as shown in FIG. 1, a plurality of cameras 4, 6, . . . , 16, 18 capture the images of the same object, and transmit digital or analog image signals to a multi-view video encoder 40 through transmission lines 20, 22, . . . , 32, 34. The multi-view video encoder compresses data, and transmits the compressed data to a multi-view video decoder 48 through a transmission line 42, the Internet 44 or a dedicated data network, and a transmission line 46. The multi-view video decoder 48 decodes the data and outputs all or some of the frames of the multi-view video to an output device, such as a monitor 40.

The pictures of the multi-view video overlap temporally and spatially. Therefore, in order to improve the efficiency of transmission, a general multi-view video encoder performs motion prediction for removing the spatial redundancy between pictures at different viewpoints as well as motion prediction in the time.

Figure 2:
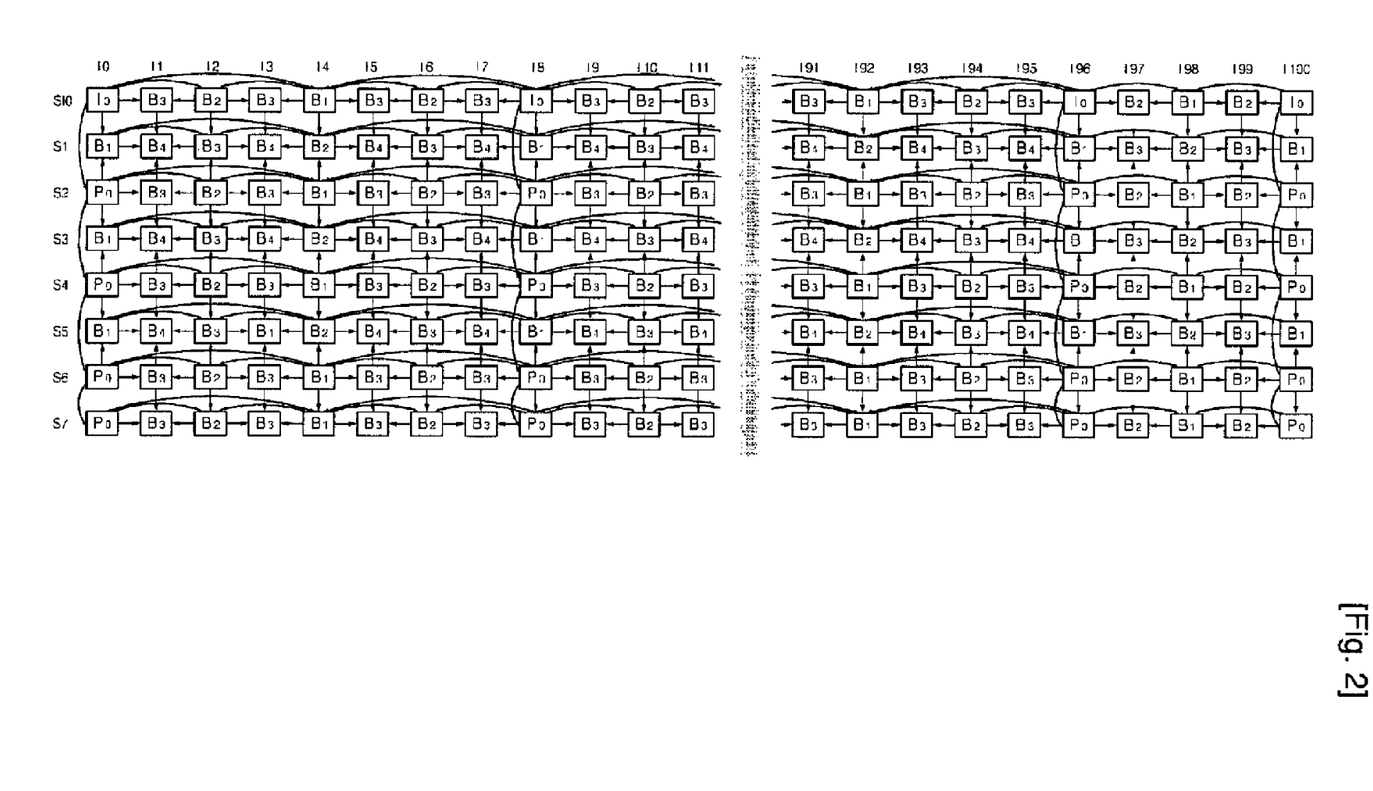
FIG. 2 is a diagram illustrating the arrangement structure of pictures of a multi-view video according to the related art.

FIG. 2 is a diagram illustrating the space-time arrangement of pictures of a multi-view video according to the related art. In the arrangement structure shown in FIG. 2, a P picture is predicted in one direction from an I picture at the first viewpoint, and is then encoded. An intermediate B picture is predicted in both directions from the I picture and the P picture and is then encoded. The pictures at the other times are encoded into B pictures that are predicted in both directions.

However, in the multi-view video encoder or an encoding method shown in FIG. 2 according to the related art, a hierarchical B picture is used in the time direction, but is not used in the view direction, which results in a low encoding efficiency of a multi-view video.

Further, in the arrangement structure of the pictures of the multi-view video according to the related art, high-quality reference pictures do not exist in the vicinities of the pictures to be encoded into the B pictures at the time or viewpoint where the picture is not encoded into the I picture or the P picture. In this case, quantization errors are accumulated in the B pictures, which causes the quality of pictures to be lowered.

DISCLOSURE OF INVENTION

Technical Problem

An object of the invention is to provide an encoder and a method of encoding a multi-view video that is capable of calculating global disparity between pictures at different viewpoints and forming a hierarchical B picture in both view and time directions on the basis of the calculated global disparity, thereby improving encoding efficiency.

Another object of the invention is to provide an encoder and a method of encoding a multi-view video that appropriately arranges pictures having high priority, that is, high-quality pictures in the multi-view video, and enables B pictures that cannot directly refer to an I picture or a P picture to refer to a high-quality picture.

Technical Solution

According to an aspect of the invention, there is provided an encoder for encoding data for pictures captured at different viewpoints in a multi-view video. When a picture at one of the first and last viewpoints is encoded into an I picture, the encoder encodes a picture, which is captured at the other viewpoint but is disposed in the same time direction, into an I/P picture. The encoder predicts a picture, which is spatially disposed between the two pictures disposed in the same time direction, in both directions from the I picture and the I/P picture and encodes the picture into a primary B picture. The encoder predicts a picture, which is spatially disposed between the primary B picture and the I picture in the same time direction, in both directions from the primary B picture and the I picture or predicts a picture, which is spatially disposed between the primary B picture and the I/P picture in the same time direction, in both directions from the primary B picture and the I/P picture, and encodes the picture into a secondary B picture.

In this structure, the n-ary B picture means a B picture that refers to an (n−1)-ary B picture. Specifically, a primary B picture refers to only the I picture or the P picture, a secondary B picture refers to the primary B picture, and a tertiary B picture refers to the secondary B picture.

In the above-mentioned aspect, when the picture at one of the first and last viewpoints is encoded into an m-ary B picture, the encoder may encode the picture, which is captured at the other viewpoint and is disposed in the same time direction, into an m-ary B picture. The encoder may encode a picture, which is spatially disposed between the two m-ary B pictures in the same time direction, into an n-ary B picture. The encoder may encode a picture, which is spatially disposed between the m-ary B picture and the n-ary B picture in the same time direction, into an o-ary B picture (where m, n, and o satisfy 1 m<n<o).

In the above-mentioned aspect, the encoder may encode a picture, which is temporally disposed between the I picture and the next I picture at the same viewpoint, that is, one of the first and the last viewpoints, into the primary B picture, and encode pictures, which are temporally disposed between the two I pictures and the primary B picture, into the secondary B pictures.

In the above-mentioned aspect, when encoding the B pictures, the encoder may calculate global disparities between the pictures at different viewpoints, and encode the pictures using the calculated global disparities. The global disparity means the difference between the positions of a camera in the horizontal direction or the vertical direction in a multi-view video, or vertical or horizontal deviation between the pictures captured by the camera.

In the above-mentioned aspect, a reference picture moving method or a motion vector initial search point moving method may be used to encode the pictures on the basis of the calculated global disparities. According to the above-mentioned structure, a hierarchical B picture is formed in the view direction on the basis of the calculated global disparities, which makes it possible to improve the encoding efficiency of a multi-view video.

In the encoder according to the above-mentioned aspect, the pictures having a minimum quantization step size at all of the viewpoints may be repeated at the same time interval.

In the encoder according to the above-mentioned structure, a GOP of the multi-view video may have a size of 8 view directions×12 time directions, and the pictures having a minimum quantization step size at all of the viewpoints may be repeated every 12 time directions.

According to another aspect of the invention, there is provided a method of encoding data for pictures captured at different viewpoints in a multi-view video. The method includes: encoding a picture at one of the first and last viewpoints into an I picture; encoding a picture, which is captured at the other viewpoint and is disposed in the same time direction as that in which the I picture is disposed, into an I/P picture; encoding a picture, which is spatially disposed between the I picture and the I/P picture, into a primary B picture; and encoding a picture, which is spatially disposed between the primary B picture and the I picture or the I/P picture, into a secondary B picture.

In the above-mentioned aspect, the method may further include: encoding the picture at one of the first and last viewpoints into an m-ary B picture; encoding a picture, which is captured at the other viewpoint and is disposed in the same time direction, into the m-ary B picture; encoding a picture, which is spatially disposed between the two m-ary B pictures in the same time direction, into an n-ary B picture (where m<n); and encoding a picture, which is spatially disposed between the m-ary B picture and the n-ary B picture in the same time direction, into an o-ary B picture (where m, n, and o satisfy 1≦m<n<o).

In the above-mentioned aspect, the method may further include: encoding a picture, which is temporally disposed between the I picture and the next I picture at the same viewpoint, that is, one of the first and the last viewpoints, into the primary B picture; and encoding pictures, which are temporally disposed between the two I pictures and the primary B picture, into the secondary B pictures.

According to still another aspect of the invention, there is provided a storage medium comprising a program for allowing a computer to execute a method of encoding data for pictures captured at different viewpoints in a multi-view video. The method includes: encoding a picture at one of the first and last viewpoints into an I picture; encoding a picture, which is captured at the other viewpoint and is disposed in the same time direction as that in which the I picture is disposed, into an I/P picture; encoding a picture, which is spatially disposed between the I picture and the I/P picture, into a primary B picture; and encoding a picture, which is spatially disposed between the primary B picture and the I picture or the I/P picture, into a secondary B picture.

In the storage medium according to the above-mentioned aspect, the method may further include: encoding the picture at one of the first and last viewpoints into an m-ary B picture; encoding a picture, which is captured at the other viewpoint and is disposed in the same time direction as that in which the m-ary B picture is disposed, into an m-ary B picture; encoding a picture, which is spatially disposed between the two m-ary B pictures in the same time direction, into an n-ary B picture (where m<n); and encoding a picture, which is spatially disposed between the m-ary B picture and the n-ary B picture in the same time direction, into an o-ary B picture (where m, n, and o satisfy 1≦m<n<o).

According to yet another aspect of the invention, there is provided a storage medium for storing encoded data for pictures captured at different viewpoints in a multi-view video. The encoded data has a data structure including: an I picture obtained by encoding a picture at one of the first and last viewpoints; an I/P picture obtained by encoding a picture that is captured at the other viewpoint but is disposed in the same time direction as that in which the I picture is disposed; a primary B picture obtained by predicting a picture, which is spatially disposed between the two pictures disposed in the same time direction, in both directions from the I picture and the I/P picture and encoding the picture; and a secondary B picture obtained by predicting a picture, which is spatially disposed between the primary B picture and the I picture in the same time direction, in both directions from the primary B picture and the I picture or predicting a picture, which is spatially disposed between the primary B picture and the I/P picture in the same time direction, in both directions from the primary B picture and the I/P picture, and encoding the picture.

In the above-mentioned aspect, in the encoded data, when the picture at one of the first and last viewpoints is encoded into an m-ary B picture, the picture, which is captured at the other viewpoint and is disposed in the same time direction, may be encoded into an m-ary B picture. A picture that is spatially disposed between the two m-ary B pictures in the same time direction may be encoded into an n-ary B picture. A picture that is spatially disposed between the m-ary B picture and the n-ary B picture in the same time direction may be encoded into an o-ary B picture (where m, n, and o satisfy 1≦m<n<o).

In the above-mentioned aspect, the encoded data may have a data structure in which a picture that is temporally disposed between the I picture and the next I picture at the same viewpoint, that is, one of the first and the last viewpoints, is encoded into a primary B picture and pictures that are temporally disposed between the two I pictures and the primary B picture are into the secondary B pictures.

In the above-mentioned aspect, the encoded data may have a space-time picture arrangement structure in which pictures having a minimum quantization step size at all of the viewpoints are repeated at the same time interval.

In the above-mentioned aspect, in the encoded data, a GOP of the multi-view video may have a size of 8 view directions× 12 time directions, and the pictures having a minimum quantization step size at all of the viewpoints may be repeated every 12 time directions.

Advantageous Effects

According to an encoder and an encoding method of the invention, it is possible to form a hierarchical B picture in the view direction as well as the time direction, and thus remove the redundancy between the pictures at different viewpoints. As a result, it is possible to effectively encode a multi-view video.

Further, according to the encoder and the encoding method of the invention, pictures that are captured at a plurality of viewpoints and have high priority appear at the same time interval, which makes it possible to obtain a high-quality picture at the time or viewpoint where an I picture or a P picture does not exist.

BEST MODE FOR CARRYING OUT THE INVENTION

Hereinafter, a method of encoding a multi-view video in both view and time directions using a hierarchical B picture on the basis of global disparity, an encoder, and a storage medium according to exemplary embodiments of the invention will be described with reference to the accompanying drawings. However, the exemplary embodiments of the invention are just illustrative, but the scope and spirit of the invention are not limited to the exemplary embodiments.

Figure 3:
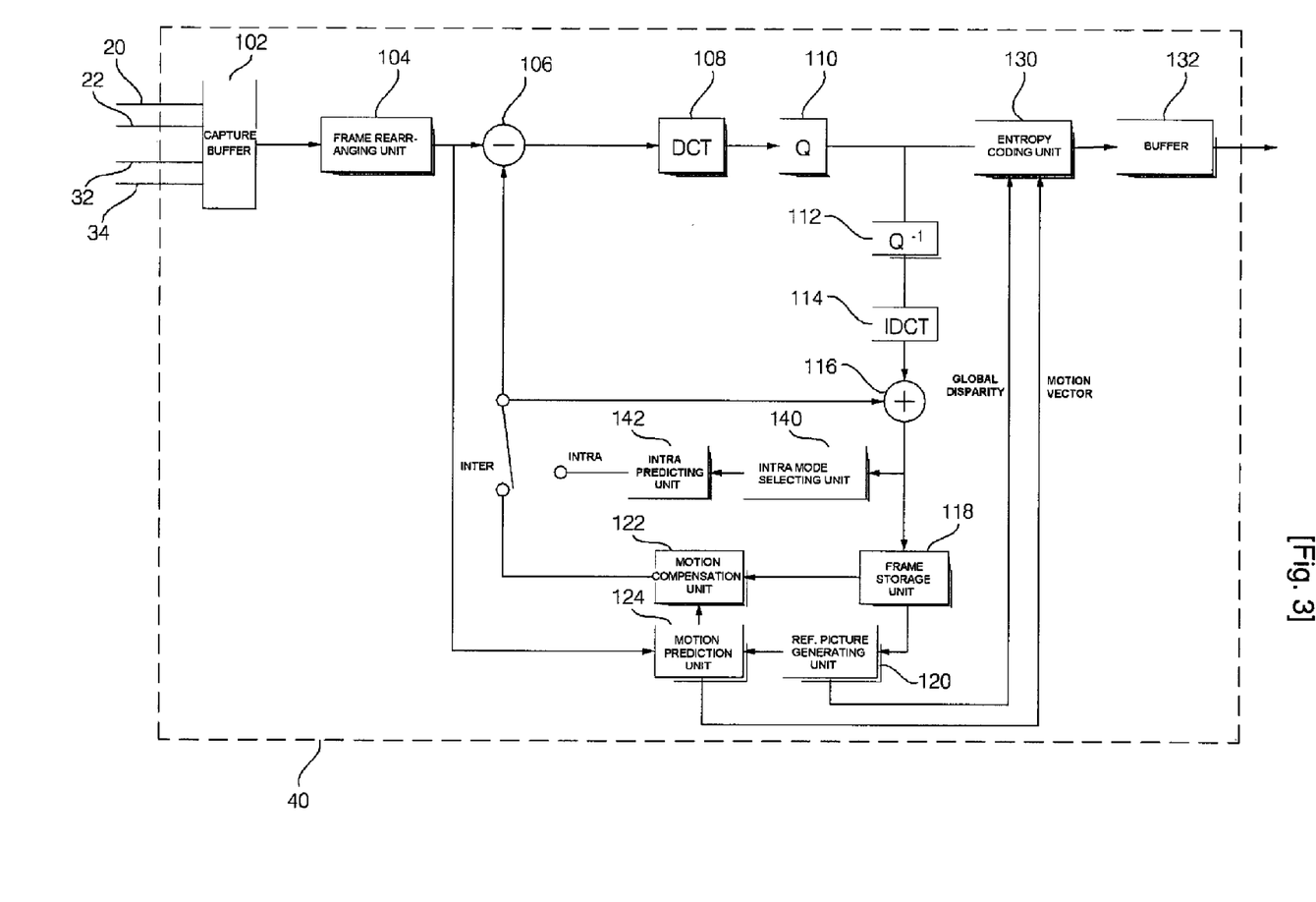
FIG. 3 is a block diagram illustrating the structure of a multi-view video encoder using a hierarchical B picture in the view direction according to an embodiment of the invention.

FIG. 3 is a block diagram illustrating the structure of a multi-view video encoder according to an embodiment of the invention. Specifically, first, video feeds received from a plurality of cameras shown in FIG. 1 through transmission lines 20, 22, . . . , 32, 34 are input to a capture buffer 102. In this embodiment, the capture buffer 102 captures an image from the video feeds transmitted through the transmission lines 20, 22, . . . , 32, 34 and temporarily stores the captured image. In FIG. 3, a frame rearranging unit 104 according to this embodiment accesses the capture buffer 102 in a rearranging order, which will be described later, and provides data for a target picture to a motion predicting unit 124 and a subtracter 106.

A forward path will be described with reference to FIG. 3. Data for a target image that is output from the frame rearranging unit 104 is input to the subtracter 106. The subtracter 106 calculates a matrix for the difference between the target image and a reference image that is reconstructed by a motion compensating unit 122 and transmits the matrix to a DCT unit 108. The DCT unit 108 performs discrete cosine transform on the matrix to obtain a DCT coefficient. A quantizing unit 110 quantizes the DCT coefficient obtained by the DCT unit 108. The quantized DCT coefficient is transmitted to an entropy encoding unit 130 and is then subjected to entropy encoding by, for example, CAVLC or CAVAC. The bits subjected to the entropy encoding are transmitted to an external network through a buffer 132.

Next, a reconstruction path will be described below with reference to FIG. 3. In this embodiment, data output from the quantizing unit 110 is input to a dequantizing unit 112, an IDCT unit 114, and an adder 116. An intra mode selecting unit 140 determines whether to encode a picture into an I frame using an intra mode or into a P or B picture using an inter mode. When a picture is encoded in the intra mode, an intra predicting unit 142 generates an I picture using a picture predicting algorithm.

Meanwhile, when a picture is encoded in the inter mode, the reconstructed picture is stored in a frame storage unit 118, and the stored picture is provided to a motion compensating unit 122 and a reference picture generating unit 120. The reference picture generating unit 120 receives one or two pictures from the frame storage unit 118 and generates a reference picture. The detailed structure of the reference picture generating unit 120 and a method of generating the reference picture will be described later. A motion predicting unit 124 uses the reference picture to predict the motion of a target picture input from the frame rearranging unit 104, and transmits motion vectors for blocks of the target picture to an entropy encoding unit 130. The motion vectors obtained by the motion predicting unit 124 is transmitted to the motion compensating unit 122, thereby forming a predicted picture. A subtracter 106 calculates the difference between the predicted picture and the target picture input from the frame rearranging unit 104, and the difference is transmitted to the DCT unit 108, as described above. Data for the picture predicted by the motion compensating unit 122 and information on the matrix reconstructed by the IDCT unit 114 are input to the adder 116, and data for the reconstructed target picture is stored in the frame storage unit 118.

Figure 4:
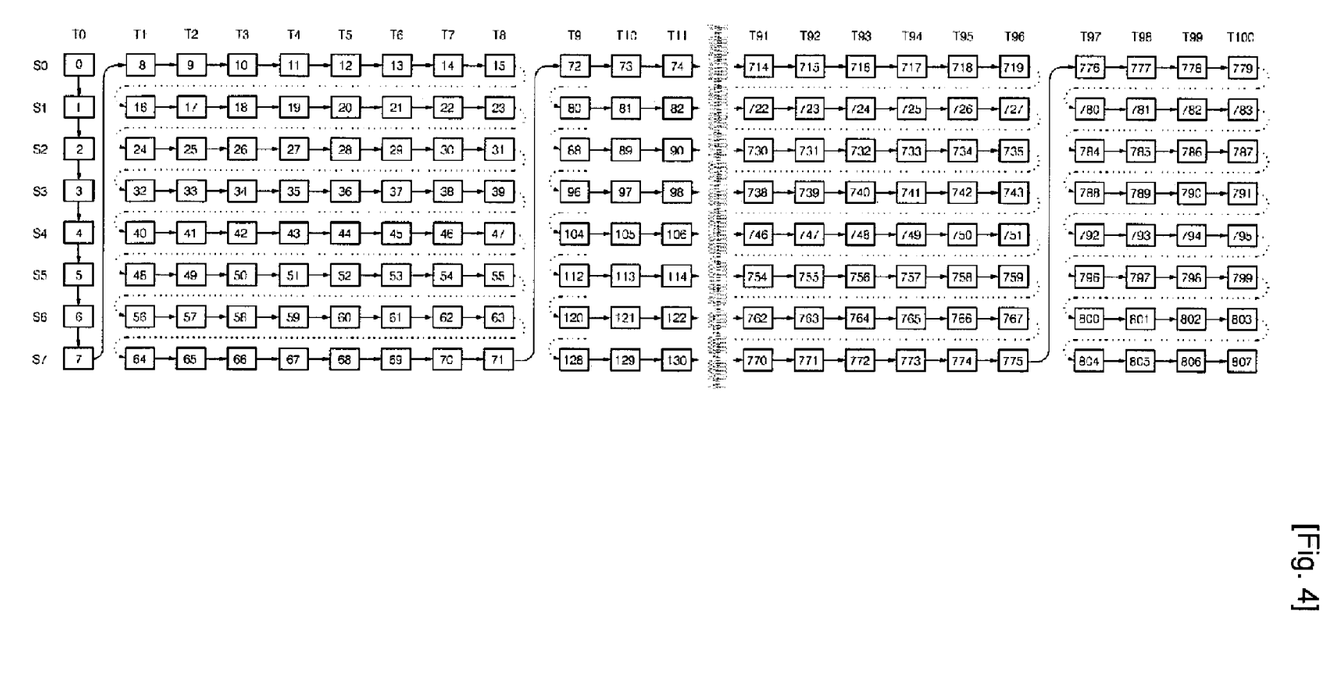
FIG. 4 is a diagram illustrating the rearrangement of multi-view video feeds by a frame rearranging unit shown in FIG. 3.

FIG. 4 is a diagram illustrating the arrangement of pictures of a multi-view video by the frame rearranging unit 104 of the encoder according to the first embodiment of the invention. As shown in FIG. 4, the frame rearranging unit 104 arranges pictures captured at all of the viewpoints S0, S1, . . . , S6, S7 at a time T0 in a line, and aligns pictures captured at the first viewpoint S0 during predetermined times T1 to T8. Then, the frame rearranging unit 104 arranges pictures captured at the next viewpoint S1 during the times T1 to T8. This process is repeatedly performed until pictures captured at a viewpoint S7 are arranged in a line during the time T1 to T8. Subsequently, the frame rearranging unit 104 arranges the pictures captured at the viewpoints S0 to S7 during predetermined times T9 to T16 in the same manner as described above.

The method of rearranging pictures as shown in FIG. 4 is used for the current H.264/AVC standard for a multi-view video. Alternatively, pictures may be arranged in a different method from the above-mentioned method of rearranging frames as shown in FIG. 4.

Figure 5:
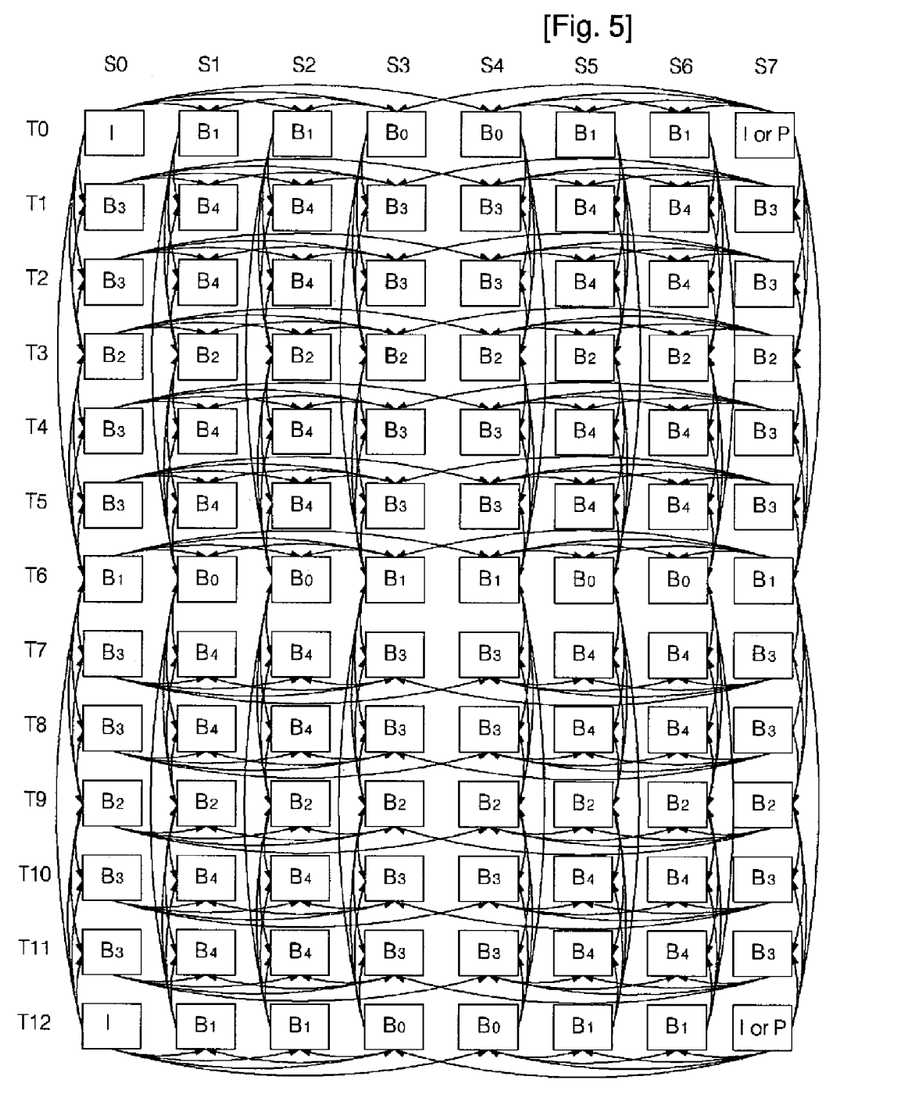
FIG. 5 is a diagram illustrating the space-time arrangement structure of pictures of a multi-view video and the reference of the pictures.

FIG. 5 is a diagram illustrating an example of the space-time structure of a multi-view video using a hierarchical B picture in the time direction and the viewing direction according to the embodiment. In FIG. 5, the horizontal axis indicates viewpoints S0, S1, . . . , S6, S7, and the vertical axis indicates times T0, T1, . . . , T11, T12. That is, in this embodiment, the number of viewpoints is 8, and a GOP (group of pictures) having a 12-picture length in the time direction is used.

In FIG. 5, in $B_n$ indicating the picture, a subscript 'n' means the priority of the picture. Specifically, an I picture, a P picture, and a $B_0$ picture have the highest priority level (priority 0), followed by $B_1$ (priority 1), $B_2$ (priority 2), $B_3$ (priority 3), and $B_4$ (priority 4). A picture having high priority has a small quantization step size, and a small amount of quantization error occurs in the picture. On the other hand, a picture having low priority has a large quantization step size, and a large amount of quantization error occurs in the picture. In this embodiment, a QP value, which is a standard for the quantization step depending on the priority, is shown in Table 1.

TABLE 1

| | Priority | | | | |
|---|---|---|---|---|---|
| | 0 | 1 | 2 | 3 | 4 |
| QP | 20 | 23 | 24 | 25 | 26 |

Next, encoding in the viewing direction at the time T0 will be described below. First, a picture captured at the viewpoint S0 is encoded into an I picture. Then, a picture at the viewpoint S7 is encoded into a P picture that is predicted from the I picture or the picture at the viewpoint S0 in one direction. Hereinafter, the I picture or the P picture at the viewpoint S7 is referred to as an I/P picture. Then, pictures at the viewpoints S3 and S4 are predicted in both directions on the basis of the pictures at the viewpoints S0 and S7, and the pictures at the viewpoints S3 and S4 are encoded into primary B pictures. The pictures at the viewpoints S1, S2, S5, and S7 are encoded into secondary B pictures using the primary B pictures encoded from the pictures at the viewpoints S3 and S4, the I picture at the viewpoint S0, and the I/P picture at the viewpoint S7.

In this embodiment, since eight viewpoints are used, the pictures at the time T0 for which the I picture appears are encoded into the secondary B pictures, but the invention is not limited thereto. When the number of viewpoints increases, a tertiary or higher B picture may be used.

Next, a process of encoding the pictures at the viewpoint S0 during the times T0 to T12 will be described below. As described above, the picture at the time T0 is encoded into the I picture, and the picture at the time T12 is also encoded into the I picture. The picture at the time T6 is predicted from the pictures at the times T0 and T12 in both directions, and is then encoded into the primary B picture. The picture at the time T3 is predicted from the pictures at the times T0 and T6 in both directions, and is then encoded into the secondary B picture. The picture at the time T9 is predicted from the pictures at the times T6 and T12 in both directions, and is then encoded into the secondary B picture. Then, the pictures at the times T1, T2, T4, and T5 are encoded into the tertiary B pictures on the basis of the pictures at the times T0, T3, and T6. Similarly, the pictures at the times T7, T8, T10, and T11 are encoded into the tertiary B pictures on the basis of the pictures at the times T6, T9, and T9.

The pictures at the other times are encoded into B pictures having several orders, as shown in FIG. 5.

In this embodiment, the pictures having high priority are arranged in a matrix at all the times. As described above, in this embodiment, the pictures having priority level 0 appears at the same time interval at all the viewpoints, as shown in FIG. 5. For example, as the viewpoint S0, the I picture having priority level 0 and the next I picture appear at the time interval of 12 pictures in the time direction. At the viewpoints S1 and S2, the picture $B_0$ having priority level 0 appears at the time T6, and then the next picture $B_0$ appears after the time interval of 12 pictures in the time direction (not shown). Therefore, in this embodiment, in the space-time structure of a multi-view video, the pictures having priority 0 are uniformly arranged at the time when the I picture does not appear. That is, the pictures having priority 0 appear at the same time interval, which makes it possible for the B picture at an arbitrary position to refer to the picture having high priority.

Next, a method of encoding the B picture using a reference picture moving method will be described in detail below. The method of encoding the B picture using a reference picture moving method can encode pictures captured at different viewpoints with a high degree of efficiency.

The encoder according to this embodiment includes the reference picture generating unit 120 in order to use the reference picture moving method. The structure of the reference picture generating unit 120 used in this embodiment will be described in detail below with reference to FIG. 6. The reference picture generating unit 120 includes an up-sampling processing unit 202, a global disparity calculating unit 204, a reference picture moving unit 205, an edge copy processing unit 206, an edge padding processing unit 208, and a filter 210.

Figure 6:
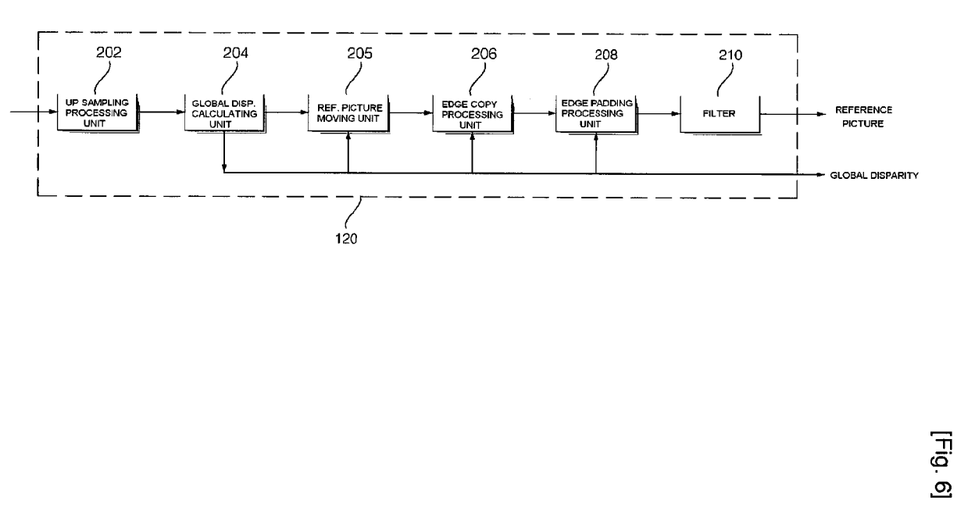
FIG. 6 is a block diagram illustrating the detailed structure of a reference picture generating unit shown in FIG. 3.

The up-sampling processing unit 202 of the reference picture generating unit 120 performs up-sampling on a view image that is input to the reference picture generating unit 120. The up-sampling processing unit 202 uses interpolation to enlarge the image four times or sixteen times. In order to calculate global disparity between the target picture and the reference picture, the target picture and the reference picture subjected to up-sampling by the up-sampling processing unit 202 are input to the global disparity calculating unit 204. The global disparity calculating unit 204 performs an operation represented by the following Expression 1 on the luma values of pixels to calculate the global disparity between the target picture and the reference picture.

$$g_{xy} = \min_{x, y} \left[ \frac{\sum_{i,j \in R} |img0(i, j) - img1(i-x, j-y)|}{R} \right] \quad \text{MathFigure 1}$$

Figure 7:
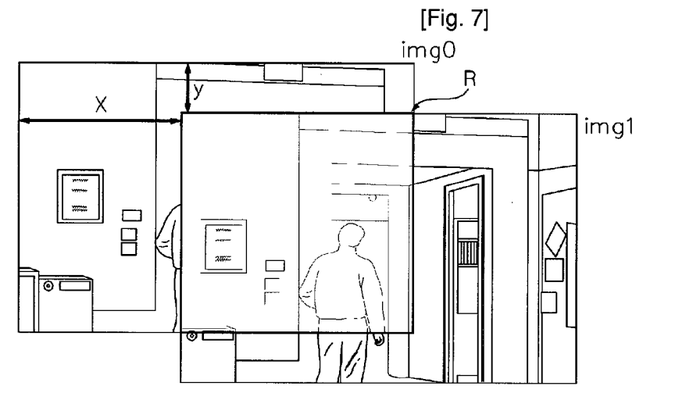
FIG. 7 is a diagram illustrating a process of overlapping two pictures and moving the two pictures in order to calculate global disparity between the two pictures in a reference picture moving method.

In Expression 1, $g_{xy}$ indicates a value obtained by dividing the sum of the differences between the minimum luma values of two different pictures by the area R of an overlapping region between the two pictures, $img0(i, j)$ indicates the luma value of a pixel positioned at coordinates $(i, j)$ on the picture at the first viewpoint, $img1(i-x, j-y)$ indicates the luma value of a pixel at coordinates $(i-x, j-y)$ on the picture at the second viewpoint, and R indicates the area of an overlapping region when the deviation values of two pictures are referred to as x and y (see FIG. 7). The value $g_{xy}$ is obtained by calculating the difference between the luma values of the two pictures for all of the values x and y and by dividing the calculated value by the area R of the overlapping region between the two pictures. The values x and y where the value obtained by dividing the differences between the luma values of all of the pixels by the area R of the overlapping region becomes minimum are global disparity values $(x_m, y_m)$ between the two pictures. As described above, since the up-sampling processing unit 202 performs up-sampling on the original picture, the values $x_m$ and ym are calculated for sub-pixels of the original picture, which makes it possible to more accurately calculate the disparity value than the existing method in which the up-sampling process is not performed. The calculated global disparity values ($x_m$, $y_m$) are provided to the reference picture moving unit 205, the edge copy processing unit 206, the edge padding processing unit 208, and the entropy encoding unit 130.

After the global disparity calculating unit 204 calculates the global disparity values ($x_m$, $y_m$), the reference picture moving unit 205 increases the number of pixels of the reference picture in the x and y directions to be larger than the global disparity values in the x and y directions, and moves the reference picture by the global disparity values ($x_m$, $y_m$). Then, a second reference picture is input to the reference picture generating unit 120, and is processed by the up-sampling processing unit 202, the global disparity calculating unit 204, and the reference picture moving unit 205, similar to the reference picture. After the global disparity between the second reference picture and the target picture is calculated, the edge copy processing unit 206 uses the global disparities between the reference picture and the target picture and between the second reference picture and the target picture to copy a non-overlapping region between the reference picture and the second reference picture.

If there are vacant pixels that are not covered by the copied reference picture and second reference picture, the edge padding processing unit 208 pads the vacant pixels with adjacent pixel values to generate a new reference picture and a new second reference picture.

Next, the operation of the reference picture generating unit 120 generating a new reference picture and a new second reference picture will be described in detail below. First, the up-sampling processing unit 202 performs up-sampling on a target picture, a reference picture, and a second reference picture. Then, the global disparity calculating unit 204 calculates the global disparities between the reference picture and the target picture and between the second reference picture and the target picture.

Figure 8:
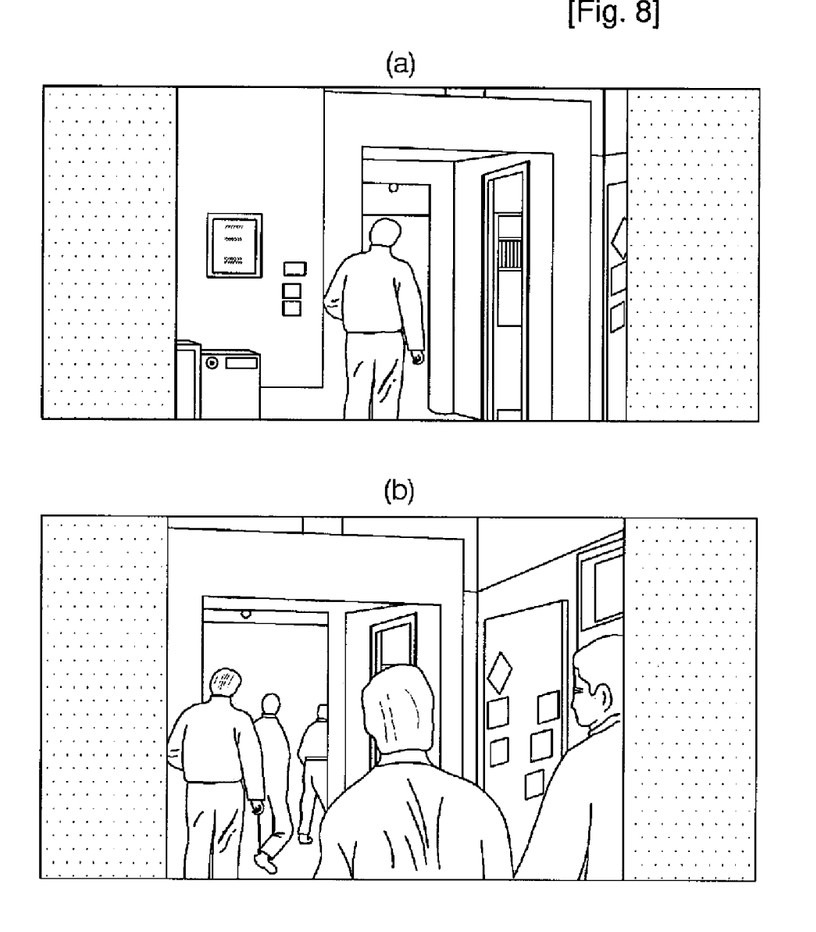
FIGS. 8A and 8B are diagrams enlarging two pixels of the original reference picture for a multi-view video in the horizontal direction.
Figure 9:
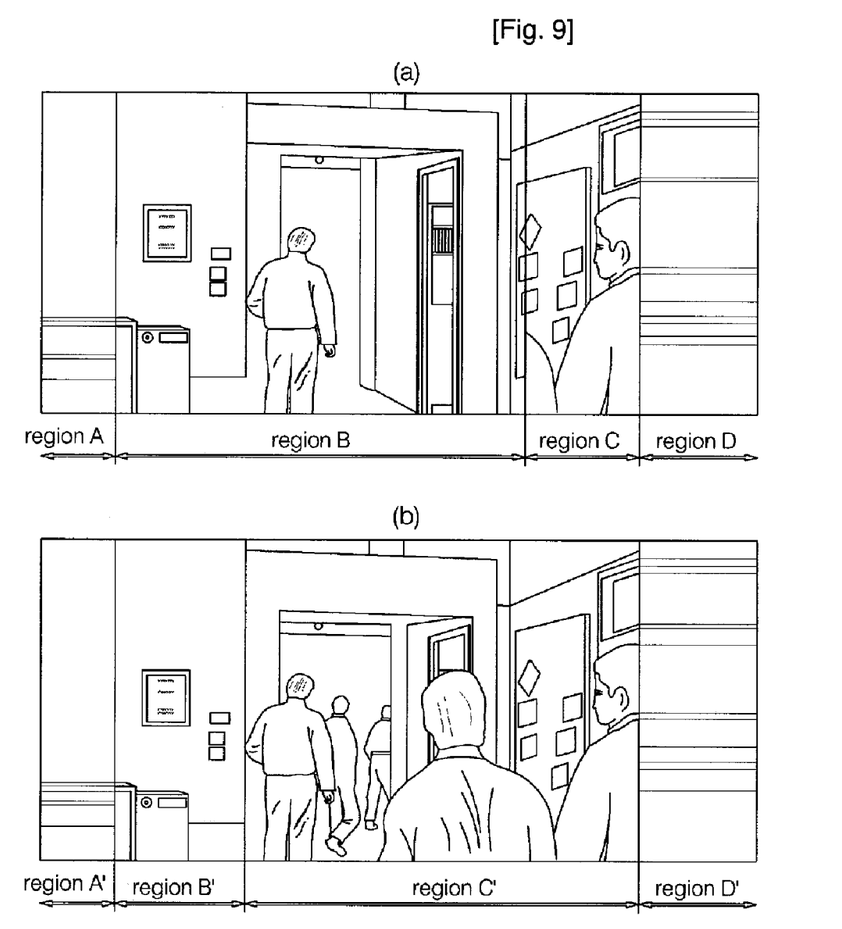
FIGS. 9A and 9B are diagrams illustrating new reference pictures that are generated by compensating for the global disparities of the reference pictures shown in FIGS. 8A and 8B and performing a moving process, a copy process, and a padding process on the reference pictures.
Figure 10:
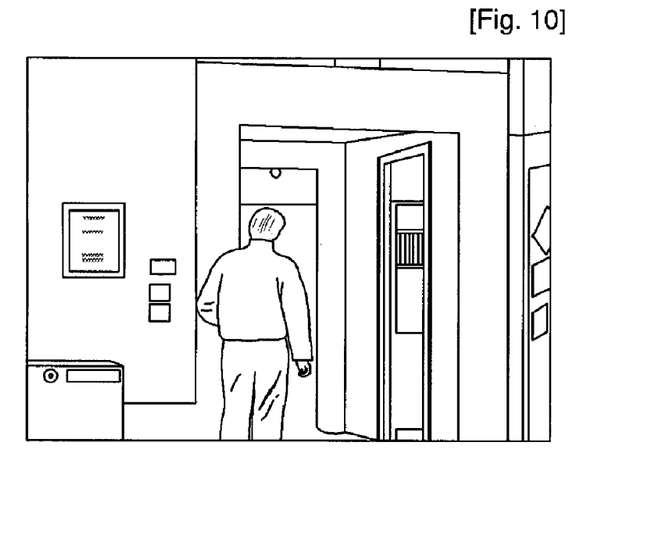
FIG. 10 is a diagram illustrating a target picture that refers to the pictures shown in FIGS. 8A and 8B in order to perform encoding.

For example, FIGS. 8A and 8B show an enlarged reference picture and an enlarged second reference picture, respectively. FIG. 10 shows a target picture that is encoded into a B picture on the basis of the reference picture and the second reference picture. In FIGS. 8A and 8B, since the pixel values of both sides of the picture are not determined before both sides are processed by the edge copy processing unit 206, both sides of the picture are displayed in gray. Then, the reference picture moving unit 205 moves the reference picture and the second reference picture by the global disparities between the target picture and the reference picture and between the target picture and the second reference picture, respectively. The reference picture shown in FIG. 8A is moved to the left side, and the second reference picture shown in FIG. 8B is moved to the right side. The portions moved in FIGS. 8A and 8B are represented by regions B and C' in FIGS. 9A and 9B, respectively.

Subsequently, the edge copy processing unit 206 calculates global disparity between the reference picture and the second reference picture on the basis of the global disparity between the reference picture and the target picture and the global disparity between the second reference picture and the target picture. The edge copy processing unit 206 uses the calculated global disparity between the reference picture and the second reference picture to copy a region that appears on the reference picture, but does not appear on the second reference picture and a region that appears on the second reference picture but does not appear on the reference picture to the second reference picture and the reference picture, respectively. The copied regions correspond to a region C shown in FIG. 9A and a region B' shown in FIG. 9B.

For vacant pixels on the reference picture and the second reference picture that are not covered with the copied regions of the reference picture and the second reference picture, the edge padding processing unit 208 pads the vacant pixels with adjacent pixel values. The padded regions are represented by regions A and D in FIG. 9A and regions A' and D' in FIG. 9B.

The reference picture and the second reference picture output from the edge padding processing unit 208 pass through the filter 210, which is the last stage of the reference picture generating unit 120. The reference picture and the second reference picture passing through the filter 210 are smoothed. The filter 210 smoothes regions of the picture that is discontinuously and rapidly changed by the edge copy processing unit 206 and the edge padding processing unit 208.

In this embodiment, the reference picture, the second reference picture, and the target picture generated by the reference picture generating unit 120 are input to the motion predicting unit 124 of the encoder 40. The motion predicting unit 124 calculates motion vectors of the target picture shown in FIG. 10, on the basis of the reference picture and the second reference picture, and transmits the motion vectors to the entropy encoding unit 130 and the motion compensating unit 122 of the encoder 40.

In this embodiment, in order to prevent confusion, only the horizontal global disparity occurs between the reference pictures shown in FIGS. 8A and 8B and the target picture shown in FIG. 10. However, if vertical global disparity exists between the target picture and the reference picture, the copied region and the padded region exist in the vertical direction as well as the horizontal direction.

Further, in this embodiment, two reference pictures are used in order to encode the picture shown in FIG. 10 into a B picture. However, the invention can be applied to the structure in which a target picture is composed of a P picture, not the B picture. In this case, one reference picture, not two reference pictures, is used, global disparity between the target picture and the reference picture is calculated, and only the padding process is performed on the reference and target pictures, without performing a copying process.

In this embodiment, the reference picture moving method is used to encode a picture captured at a different viewpoint among an I picture, a P picture and a B picture into the B picture, but the invention is not limited thereto. Instead of the reference picture moving method, an initial search point moving method may be used to encode the B picture. In the initial search point moving method, the global disparity values ($x_m$, $y_m$) are calculated and then transmitted to the motion predicting unit, and the search position of a block of the reference picture is corrected on the basis of the global disparity values.

Figure 11:
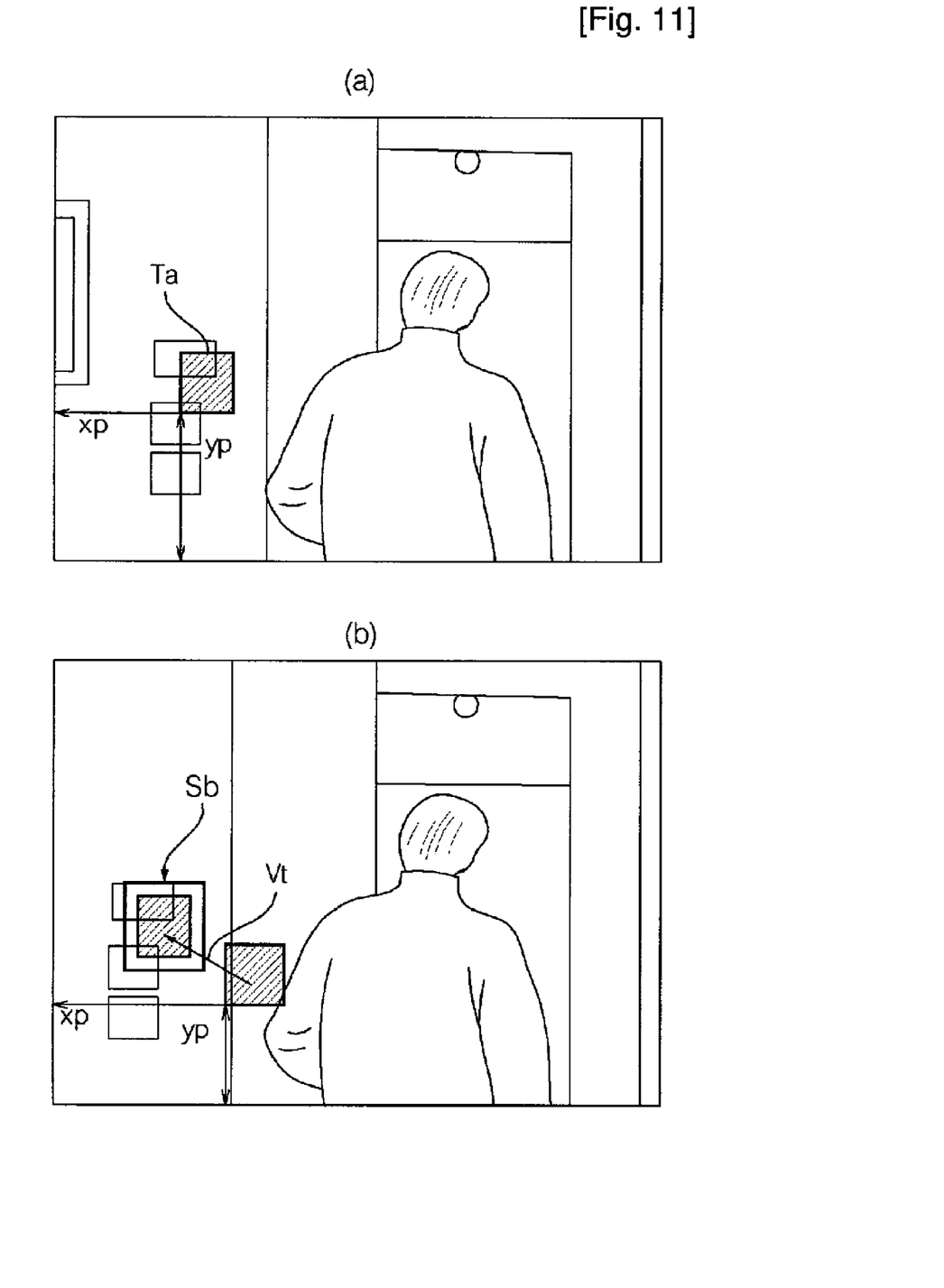
FIGS. 11A and 11B are diagrams illustrating a process of searching a block of a target picture from a reference picture by using an initial search point moving method.

The initial search point moving method will be described in detail below. FIG. 11A shows an encoded picture, and in FIG. 11A, a block Ta is positioned at coordinates (xp, yp) on the picture as using the lower left corner as the origin. FIG. 11B shows a target picture to be encoded. As can be seen from FIG. 11B, the target picture deviates in the right direction from the reference picture shown in FIG. 11A. In the initial search point moving method, when the motion predicting unit of the encoder searches a block of the target picture from the reference picture, the motion predicting unit searches the block on the reference picture that is moved by a global disparity vector Vt. In this case, even when the global disparity value is large, it is possible to rapidly and accurately search a corresponding block within a predetermined search range of the target picture since the search position has already been moved in consideration of global disparity.

The encoder or an apparatus for performing an encoding method according to the invention may be composed of a dedicated apparatus formed of a single integrated circuit or a plurality of integrated circuits. Alternatively, it may be realized by installing programs for performing the encoding method to a general-purpose computer. When the programs are installed to the computer, the programs may be stored in a hard disk of the computer, or all or some of the programs may be downloaded to the computer over a network, if necessary.

INDUSTRIAL APPLICABILITY

According to the above-described embodiment of the invention, it is possible to improve the encoding and decoding efficiencies of a multi-view video and thus obtain a high-quality video. Therefore, the invention is useful for the multimedia industries using the multi-view video.

The invention claimed is:

1. An encoder for encoding data for pictures captured at different viewpoints in a multi-view video,
wherein, when a first picture at one of a first viewpoint and a last viewpoint is encoded into an I picture, the encoder encodes a second picture, which is captured at the other one of the first viewpoint and the last viewpoint but is disposed in the same time direction as that in which the first picture is disposed, into an I/P picture,
wherein the encoder predicts a third picture, which is spatially disposed between the I picture and the I/P picture, in both directions from the I picture and the I/P picture, and encodes the third picture into a primary B picture having a priority level 0,
wherein the encoder predicts a fourth picture, which is spatially disposed between the primary B picture and the I picture in the same time direction, in both directions from the primary B picture and the I picture, or predicts a fifth picture, which is spatially disposed between the primary B picture and the I/P picture in the same time direction, in both directions from the primary B picture and the I/P picture, and encodes the fourth or fifth picture into a secondary B picture having a priority level 1 that has lower priority than the priority level 0,
wherein, when a sixth picture, which is at one of the first viewpoint and the last viewpoint and in a different time direction from the first picture, is encoded into an m-ary B picture having a priority level (m−1), the encoder encodes a seventh picture, which is captured at the other one of the first viewpoint and the last viewpoint but is disposed in the same time direction as that in which the sixth picture is disposed, into an m-ary B picture,
wherein the encoder encodes an eighth picture, which is spatially disposed between the two m-ary B pictures in the same time direction, into an n-ary B picture having a priority level (n−1),
wherein the encoder encodes a ninth picture, which is spatially disposed between any of the two m-ary B pictures and the n-ary B picture in the same time direction, into an o-ary B picture having a priority level (o−1), and
wherein m, n, and o are positive integers and satisfy 1≦m<n<o.

2. The encoder of claim 1,
wherein the encoder is configured to encode a picture that is temporally disposed between the I picture and a next I picture at the same viewpoint, into a primary B picture, and encode pictures that are temporally disposed between any of the two I pictures and the primary B picture into the secondary B picture.

3. The encoder of claim 1,
wherein, when encoding pictures into B pictures, the encoder is configured to calculate global disparities between pictures at different viewpoints, and encode the pictures using the calculated global disparities.

4. The encoder of claim 3,
wherein a reference picture moving method or a motion vector initial search point moving method is used to encode the pictures on the basis of the calculated global disparities.

5. The encoder of claim 1,
wherein pictures having a minimum quantization step size at all of the viewpoints are repeated at the same time interval.

6. The encoder of claim 1,
wherein a group of pictures (GOP) of the multi-view video has a size of 8 view directions×12 time directions, and pictures having a minimum quantization step size at all of the viewpoints are repeated every 12 time directions.

7. A method of encoding data for pictures captured at different viewpoints in a multi-view video, comprising:
encoding a first picture at one of a first viewpoint and a last viewpoint into an I picture;
encoding a second picture, which is captured at the other one of the first viewpoint and the last viewpoint and is disposed in the same time direction as that in which the first picture is disposed, into an I/P picture;
encoding a third picture, which is spatially disposed between the I picture and the I/P picture, into a primary B picture having a priority level 0;
encoding a fourth picture, which is spatially disposed between the primary B picture and the I picture or the I/P picture, into a secondary B picture having a priority level 1 that has lower priority than the priority level 0;
encoding a fifth picture, which is at one of the first viewpoint and the last viewpoint and in a different time direction from the first picture, into an m-ary B picture having a priority level (m−1);
encoding a sixth picture, which is at the other one of the first viewpoint and the last viewpoint and is disposed in the same time direction as that in which the fifth picture is disposed, into an m-ary B picture;
encoding a seventh picture, which is spatially disposed between the two m-ary B pictures in the same time direction, into an n-ary B picture having a priority level (n−1); and
encoding an eighth picture, which is spatially disposed between any of the two m-ary B pictures and the n-ary B picture in the same time direction, into an o-ary B picture having a priority level (o−1),
wherein m, n, and o are positive integers and satisfy 1≦m<n<o.

8. The method of claim 7, further comprising:
encoding a picture, which is temporally disposed between the I picture and a next I picture at the same viewpoint, into the primary B picture; and
encoding pictures, which are temporally disposed between any of the two I pictures and the primary B picture, into the secondary B pictures.

9. The method of claim 8,
wherein encoding the picture into the B pictures includes:
calculating global disparities between pictures at different viewpoints.

10. The method of claim 9,
wherein the calculating of the global disparities is performed by a reference picture moving method or a motion vector initial search point moving method.

11. A storage medium comprising a program for allowing a computer to execute a method of encoding data for pictures captured at different viewpoints in a multi-view video,
the method comprising:
encoding a first picture at one of a first viewpoint and a last viewpoint into an I picture;
encoding a second picture, which is captured at the other one of the first viewpoint and the last viewpoint and is disposed in the same time direction as that in which the first picture is disposed, into an I/P picture;
encoding a third picture, which is spatially disposed between the I picture and the I/P picture, into a primary B picture having a priority level 0; and
encoding a fourth picture, which is spatially disposed between the primary B picture and the I picture or the I/P picture, into a secondary B picture having a priority level 1 that has lower priority than the priority level 0,
wherein the method further includes:
encoding a fifth picture, which is at one of the first viewpoint and the last viewpoint and in a different time direction from the first picture, into an m-ary B picture having a priority level (m−1);
encoding a sixth picture, which is at the other one of the first viewpoint and the last viewpoint and is disposed in the same time direction as that in which the fifth picture is disposed, into an m-ary B picture;
encoding a seventh picture, which is spatially disposed between the two m-ary B pictures in the same time direction, into an n-ary B picture having a priority level (n−1); and
encoding an eighth picture, which is spatially disposed between any of the two m-ary B pictures and the n-ary B picture in the same time direction, into an o-ary B picture having a priority level (o−1),
wherein m, n, and o are positive integers and satisfy $1 \leq m < n < o$.

12. A storage medium for storing encoded data for pictures captured at different viewpoints in a multi-view video,
wherein the encoded data has a data structure including:
an I picture obtained by encoding a first picture at one of a first viewpoint and a last viewpoint;
an I/P picture obtained by encoding a second picture that is captured at the other one of the first viewpoint and the last viewpoint but is disposed in the same time direction as that in which the first picture is disposed;
a primary B picture having a priority level 0 obtained by predicting a third picture, which is spatially disposed between the first and second pictures disposed in the same time direction, in both directions from the I picture and the I/P picture and encoding the third picture; and
a secondary B picture having a priority level 1 obtained by predicting a fourth picture, which is spatially disposed between the primary B picture and the I picture in the same time direction, in both directions from the primary B picture and the I picture or predicting a fifth picture, which is spatially disposed between the primary B picture and the I/P picture in the same time direction, in both directions from the primary B picture and the I/P picture, and encoding the fifth picture, the priority level 1 having lower priority than the priority level 0,
wherein, in the encoded data, when a sixth picture at one of the first viewpoint and the last viewpoint is encoded into an m-ary B picture having a priority level (m−1), a seventh picture, which is at the other one of the first viewpoint and the last viewpoint and is disposed in the same time direction as that in which the sixth picture is disposed, is encoded into an m-ary B picture,
wherein an eighth picture, which is spatially disposed between the two m-ary B pictures in the same time direction, is encoded into an n-ary B picture having a priority level (n−1), and
wherein a ninth picture, which is spatially disposed between any of the two m-ary B pictures and the n-ary B picture in the same time direction, is encoded into an o-ary B picture having a priority level (o−1),
wherein m, n, and o are positive integers and satisfy $1 \leq m < n < o$.

13. The storage medium of claim 12,
wherein the encoded data has a data structure in which a picture that is temporally disposed between the I picture and a next I picture at a same viewpoint, is encoded into the primary B picture, and pictures that are temporally disposed between any of the two I pictures and the primary B picture are encoded into the secondary B picture.

14. The storage medium of claim 13,
wherein the encoded data has a data structure in which pictures having a minimum quantization step size at all of the viewpoints are repeated at the same time interval.

15. The storage medium of claim 14,
wherein, in the encoded data, a group of pictures (GOP) of the multi-view video has a size of 8 view directions×12 time directions, and the pictures having a minimum quantization step size at all of the viewpoints are repeated every 12 time directions.

* * * * *